2,892,792

LUBRICANT COMPOSITION

William T. Stewart, El Cerrito, Frank A. Stuart, Orinda, and Warren Lowe, Berkeley, Calif., assignors to California Research Corporation, San Francisco, Calif., a corporation of Delaware No Drawing. Original application February 3, 1956, Serial No. 563,204. Divided and this application March 19, 1957, Serial No. 646,953

5 Claims. (Cl. 252—56)

This invention relates to a novel lubricant composition, and it is particularly directed to the provision of a lubricant composition which is adapted to be employed in internal combustion engines.

With the refinements now being made in automotive and other internal combustion engines, a great deal of attention is being directed to the provision of a lubricant which will permit the engine to be operated at a high level of efficiency over long periods of time. The primary function of th lubricant is, of course, to reduce friction and thereby not only decrease the wear on pistons, piston walls, bearings and other moving parts, but also increase the efficiency of the engine. Additionally, it is also a function of the lubricant to prevent the deposition of solid products on the piston walls and other surfaces of the engine coming in contact with the lubricant. Such deposits seriously interfere with efficient engine operation for they accelerate piston ring and cylinder wall wear and also increase oil losses by plugging the oil ring grooves. The troublesome deposits which form on the face of the piston and on the other walls of the combustion chamber, as well as on valves and spark plugs are also partially attributable in many cases to the lubricant, and especially to various of the metal-containing additives employed therein. It is of importance to eliminate or at least minimize the formation of all such deposits, and it is the basic object of this invention to achieve such a result.

To a minor degree, certain of the deposits formed on engine surfaces have their origin in the oil itself, that is to say, in the decomposition products of the oil. A more important, though still minor, source of engine deposits lies in the additives with which oils are conventionally supplied. This is particularly the case with metal-containing additives as, for example, the organic, metal-containing salts which are incorporated in the oil to increase the detergency thereof, and the various metal-containing compounds which are added to increase the lubricity of the oil and reduce piston ring and cylinder wall wear. Whenever oil is burned in the engine (as occurs with the oil film present in the cylinder wall during the combustion stroke) any metal-containing additives present in the oil may form an ash which is partially deposited out on the various surfaces of the combustion chamber and on those of the spark plugs and valves. Accordingly, it is a particular object of this invention to provide a lubricant composition which is compounded with metal- or mineral-free detergents and wear-reducing additives.

While certain of the additives heretofore employed in oils (and to a lesser degree the oil itself) are partially responsible for deposits which form on engine surfaces, it is now recognized that the major sources of such deposits or their precursors lies in the various aldehydes, acids, oxy-acids and other similarly reactive, partially-oxidized combustion products of the fuel. These products are formed both under pre-ignition conditions as well as during the combustion step proper, particularly during the period before the engine has reached operating temperature. Accordingly, under city driving conditions where the engine is repeatedly started in the cold condition and is seldom driven for a distance sufficient to reach the most efficient operating temperatures, the formation of partial oxidation products is particularly severe. Many of these partial oxidation products are carried down into the crankcase of the engine along with other blow-by gases, and since most are insoluble or only sparingly soluble in lubricating oils, they tend to separate from the oil and adhere to engine surfaces or form large droplets. In either case, under the elevated temperature conditions prevailing in the engine, these reactive monomers quickly polymerize to form solid masses which readily deposit out on the engine wall surfaces.

It is the practice in the art to prevent the formation of such deposits by adding to the lubricant a material normally referred to as a detergent. Insofar as is known, all the detergent additives which have heretofore been successfully employed on a commercial scale are organic, metal-containing compounds such as calcium petroleum sulfonate, calcium cetyl phosphate, calcium octyl salicylate, calcium phenyl stearate, the barium salt of wax-substituted benzene sulfonate, or the potassium salt of the reaction product of phosphorus pentasulfide and polybutene. Various of these detergents acts by reacting chemically with deposit precursors to form harmless compounds. Others act to prevent flocculation or coagulation of solid particles in the oil and maintain the same in a state of suspension as finely divided particles. Still others not only perform this dispersant function but also effect the solubilization or emulsification of the sparingly soluble monomers in the oil and thereby greatly reduce the rate of polymerization. In the latter case, such polymer materials as do then form within the body of the oil are smaller in size and can be peptized or dispersed in the oil much more readily than is the case with the large polymeric particles which are formed on exposed engine surfaces or in droplets lying without the oil.

Detergents capable of acting in the latter fashion are preferably employed wherever possible, particularly in automotive engines to be operated under city driving conditions. However, even among the metal-containing additives, few are available which are capable of solubilizing any appreciable amount of all the many types of polymer precursors which are carried into the oil from the fuel. Accordingly, it is a more particular object of this invention to provide a lubricant composition incorporating a metal-free detergent which is capable of solubilizing or emulsifying in the lubricant large amounts of all the various partial oxidation products of the fuel which are carried into the oil, and which is also capable of maintaining in suspension in the oil the various solid polymerc materials which are present therein.

The problem of piston ring and cylinder wall wear, especially the control thereof, is also one which is closely related to the composition of the crankcase lubricant. Aside from abrasive wear, which is caused by dust and dirt and can be remedied by suitable filtering and air-cleaning means, a large part of the wear experienced by piston rings and cylinder wall is attributable to chemical attack by moisture and acidic products originating as by-products of fuel combustion. In engines operated at optimum temperature levels, these combustion products are largely discharged through the exhaust and breather pipe. However, under the relatively "cold" conditions experienced in city driving, and especially at cylinder wall temperatures below about 150° F., the moisture and acid products are condensed on the engine surfaces where they promote corrosive attack and are in a position to work past the piston and accumulate within the engine and in the crankcase oil. This difficulty is one which the art has heretofore met most successfully by supplying the lubricating oil with additives such as the various metal salts of petroleum sulfonic acids and other metal-organic compounds, especially those having a basic reaction. However, this practice has a disadvantage of adding still another metal-containing ingredient to the oil and therefore of increasing the deposit-forming characteristics of the lubricant composition. Accordingly it forms still another object of this invention to provide a lubricant composition containing a metal- or mineral-free additive which effectively decreases the wear experienced by piston rings and cylinder walls, particularly during periods before the engine has become thoroughly warmed to operating temperatures.

The present invention is based on the discovery that certain copolymers, which contain no metal component and therefore are substantially free of any ash-forming tendency, have the ability to impart excellent detergent and antiwear qualities to lubricating oils employed in internal combustion engines. In particular, these copolymers have the ability to solubilize in the oil large amounts of all the various partially oxidized combustion products of the fuels employed in internal combustion engines, while also having the ability of maintaining in a state of suspension any solid polymeric products present in the oil. Additionally, the copolymeric additives of the present invention effectively reduce the wear experienced by piston rings and cylinder wall surfaces even under the most unfavorable operating conditions such as are experienced during the starting and warming up of the engine. These additives have the advantage that they do not combine chemically with the various polymer precursors which are solubilized or dispersed in the oil, nor apparently do they act by a neutralization reaction in counteracting the effect of the various acidic fuel combustion by-products. Accordingly, they are capable of giving excellent protection against engine deposits and wear over extended operating periods. It should also be noted that the copolymeric additives of this invention are noncorrosive to the various bearing metals employed in engines.

Since the additives of the present invention differ in kind from any heretofore proposed for either detergent or antiwear purposes, it would have been surprising to discover that they were effective for either of these purposes. However, that they possessed not one but both of said qualities was altogether unexpected and could not have been predicted.

The polymeric additives of the present invention are copolymers of monomers selected from at least each of the first two classes of the classes consisting of (A) an alkyl ester of an α,β-unsaturated aliphatic monocarboxylic acid of from 3 to 8 carbon atoms and an alkyl alcohol containing from 4 to 30 carbon atoms in the alkyl group, (B) an aliphatic α,β-unsaturated, α,β-dicarboxylic acid of from 4 to 12 carbon atoms, anhydrides thereof and a monocarboxylic derivative of such acid, wherein one of said carboxyl groups is converted to a member of the group consisting of an ester, an amide or an amine salt by reaction with an appropriate hydrocarbyl alcohol or hydrocarbyl amine of from 1 to 30 carbon atoms and (C) a dihydrocarbyl ester of an aliphatic α,β-unsaturated α,β-dicarboxylic acid which is preferably the same as the acid of the (B) component, said hydrocarbyl group containing from 1 to 30 carbon atoms. Representative copolymers of the (A) and (B) type are those wherein (A) is dodecyl acrylate, 2-ethylhexyl methacrylate or decyl crotonate and (B) is maleic acid, maleic anhydride, monododecyl citraconate, monodecyl maleate, N-tridecyl-maleamic acid, or the mono (ethylamine) salt of maleic acid. Representative copolymers of the (A), (B) and (C) type are those wherein the (A) and (B) components are as indicated above and the (C) component is a compound such as dilauryl maleate, ethyl dodecyl maleate, benzyl 2-ethylhexyl maleate or dinonyl mesaconate.

Expressed structurally, the ester component (A) of the present copolymeric additives is one of the type having the general formula

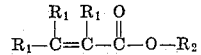

wherein the $R_1$'s, which can be the same as or different from one another, are hydrogen atoms or alkyl groups of from 1 to 4 carbon atoms each, and $R_2$ is the residue of a hydrocarbyl alcohol containing a group of from 4 to 30 aliphatic carbon atoms. The latter group is preferably a branched or straight-chain alkyl or cycloalkyl radical such as butyl, isobutyl, n-pentyl, n-hexyl, 2-ethylhexyl, decyl, tetradecyl, cyclohexyl, 4-ethylcyclohexyl, or an alkenyl radical of from 4 to 30 carbon atoms such as oleyl, ricinoleyl, or the like, wherein the ethylenic double bond has substantially no copolymerizing tendencies. Representative (A) monomer compounds, one or more of which can be employed in the copolymeric additives employed in this invention, include the following:

Butyl acrylate
2-ethylhexyl acrylate
Cyclohexyl acrylate
Lauryl acrylate
Hexadecyl acrylate
6-(p-tert. butylphenyl)-hexyl methacrylate
4-benzylcyclohexyl methacrylate
Dodecyl crotonate
Dodecyl tiglate
Tricosyl acrylate
Pentyl methacrylate
2-ethylhexyl methacrylate
Tridecyl methacrylate
p-Dodecylphenyl methacrylate
Oleyl angelate
Decyl α-propylacrylate
2-ethylhexyl α-methylcrotonate
2-ethylhexyl α-butylcrotonate
Dodecyl β-ethylcrotonate
Dodecyl hydrosorbate A preferred class of compounds falling within the (A) component category, as defined above, is made up of the higher ($C_8$–$C_{30}$) branched and straight chain alkyl acrylates and methacrylates.

Although the preferred ester component (A) of the more effective copolymeric additives according to this invention is the alkyl ester of an α,β-unsaturated monocarboxylic acid as described above, other olefinic esters may also be included in the (A) component in minor portions, that is up to 50%. Suitable esters of this type are the fatty acid esters of vinyl, allyl or methallyl alcohol with the higher fatty acid esters containing from 8 to 30 carbon atoms in the acid being preferred for optimum oil solubility and general effectiveness. Illustrative esters include vinyl caproate, allyl stearate, methallyl stearate, and the like.

The aliphatic α,β-unsaturated, α,β-dicarboxylic acids which comprise, or go to form the (B) component of the copolymeric additives, are those of the type having the structural formula

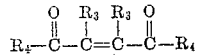

wherein the $R_3$'s, which may be the same as or different (from) one another, are hydrogen atoms or alkyl groups, preferably, those containing from 1 to 4 carbon atoms each, and the $R_4$'s represent (1) a common radical (in which case the compound is an acid anhydride), or (2) both $R_4$'s represent —OH radicals, or (3) one of the R's is an —OH radical, and the other is a —OR$_5$ (ester)

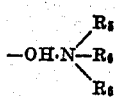

(amine salt) or

(amide) radical, where the $R_5$'s represent hydrocarbyl groups of from 1 to 30 carbon atoms, preferably alkyl in character, and the $R_6$'s represent hydrogen atoms or hydrocarbyl groups of from 1 to 30 carbon atoms which also are preferably alkyl radicals. Representative monomer compounds, one or more of which can be employed in the copolymer additives of this invention, include the following:

Maleic acid
Maleic anhydride
Monoethyl maleate
Monobutyl maleate
Monophenyl maleate
Monobenzyl maleate
Monododecyl maleate
Monooleyl maleate
Monostearyl maleate
Monotricosyl maleate
Monohexacosyl maleate
Monocyclohexyl maleate
Monotolyl maleate
Fumaric acid
Monododecyl fumarate
Itaconic acid
Mono-(2-ethylhexyl) itaconate
Citraconic acid
Monooleyl citraconate
Mono-(p-butylphenyl) citraconate
Mono-p-tolyl fumarate
Monododecyl mesaconate
Monododecyl α-hydromuconate
N-(2-ethylhexyl)-maleamic acid
N-phenyl-maleamic acid
N-ethyl-maleamic acid
N-tolyl-maleamic acid
N-ethyl-fumaramic acid
Mono(ethylamine) salt of maleic acid
Mono(diethylamine) salt of maleic acid
Mono(N-ethylaniline) salt of maleic acid
Mono(dodecylamine) salt of maleic acid
Mono(cyclohexamine) salt of fumaric acid
Mono(ethylamine) salt of citraconic acid While, as indicated above, the acidic component (B) of the present copolymeric additives can be selected from a number of varying material classes, said (B) component is preferably maleic acid, maleic anhydride or a derivative of maleic acid such as a monoalkyl maleate containing from 8 to 30 carbon atoms in the alkyl group, many examples of which have been given in the foregoing list of compounds.

The diester component (C) of the copolymer, when present, is a compound of the type having the same general formula as given above for the acidic component (B) of the copolymer, except that here both of the $R_4$'s are radicals having the formula —OR$_5$, where $R_5$ represents a hydrocarbyl group which preferably is alkyl in character, and more preferably is a higher alkyl ($C_8$–$C_{30}$) radical which is capable of improving the oil solubility of the copolymer.

Representative compounds coming into the (C) category are:

Di-(2-ethylhexyl)maleate
Ethyl dodecyl maleate
Didodecyl maleate
Dioleyl maleate
Distearyl maleate
Tolyl dodecyl maleate
Didodecyl fumarate
Di-(2-ethylhexyl) citraconate
Di-(2-ethylhexyl) itaconate The copolymers of this invention are soluble in hydrocarbon mineral oils to the extent of at least 2% by weight, and preferably to the extent of at least 10% by weight. The requisite degree of oil-solubility, coupled with good detergency and anti-wear characteristics, is possessed by those copolymers of the type described herein wherein the (A) and (B) monomers are present in the ratio of one monomer unit of (B) for each 1 to 20 monomer units of the aforedescribed (A) component. This ratio applies no matter whether the optional diester component (C) is present or absent in the copolymer; if (C) is present, however, then the total number of (B) and (C) monomer units should not exceed the number of monomer units of the (A) component which are present. More suitably, the copolymers are further characterized in that they contain from 3 to 15 ester-linked hydrocarbon groups for each free carboxylic acid and anhydride group. Within these limits, those copolymers are preferably employed which contain free carboxyl groups, and wherein there is present one such carboxyl group for each 3 to 15 ester-linked hydrocarbyl radicals of the type which contain a group of from 4 to 30 aliphatic carbon atoms and are capable of imparting oil-solubility to the polymer. In other words, in the case of a copolymer made up of dodecyl methacrylate, mono (2-ethylhexyl) maleate and didecyl maleate, the preferred copolymer would contain a total of from 3 to 15 ester-linked alkyl groups (this total being obtained by adding the number of dodecyl, decyl and 2-ethylhexyl groups present) for each carboxyl group.

The copolymers of this invention can be prepared by one or more of a variety of different methods known in the art. As regards the reactants per se, there can be employed the given monomer materials (A) and (B), or (A), (B) and (C), as the case may be. Again, more than one (A), or (B), or (C) monomer can be employed. However, it is also possible to employ monomer reactants other than those which finally compose the copolymer. Thus, in the case of the ester monomer (A), one may copolymerize the corresponding unsaturated acid instead of the ester, with the balance of the ester monomer unit being supplied by subjecting the copolymer intermediate to an appropriate esterification treatment. Again, instead of employing a partial ester as the (B) component, one can employ the corresponding unsaturated acid or acid anhydride, with the desired ester then being formed after the polymerization reaction is complete. The same is true with respect to the (C) component.

A copolymer of the (A) and (B) variety, for example, that of dodecyl methacrylate and mono-2-ethylhexyl maleate, can readily be formed either by copolymerizing the two monomers, or by copolymerizing dodecyl methacrylate and maleic acid (or the anhydride thereof) and then esterifying approximately 50% of the available acid in the copolymer with 2-ethylhexanol. Again, an (A), (B) and (C) copolymer, for example, that of dodecyl methacrylate, mono-2-ethylhexyl maleate and di-2-ethylhexyl maleate, can be formed either by copolymerizing the three monomers, or by copolymerizing dodecyl methacrylate and maleic anhydride and then esterifying more than 50% and less than 100% of the available acid in the resulting copolymer with 2-ethylhexanol.

Having selected the desired monomeric reactants, the copolymer of this invention can be prepared by conventional bulk, solution or emulsion methods of addition polymerization in the presence of an addition polymerization initiator. Preferably, however, the copolymerization is effected in an inert organic solvent such as benzene, toluene, xylene or petroleum naphtha in the presence of a free radical-liberating type of initiator such as a peroxy compound, for example, benzoyl peroxide, acetyl peroxide, tert.-butyl hydroperoxide, di-tert. butyl peroxide, dibenzoyl peroxide, or di-tert. amyl peroxide, or an azo initiator such as 1,1′-azodicyclohexanecarbonitrile, or α,α′-azodiisobuteronitrile. The catalyst, or polymerization initiator, can be employed in an amount of from about 0.1 to 10%, with a preferred range being from about 0.25 to 2%. If desired, the catalyst can be added in increments as the reaction proceeds. Likewise, additional portions of the solvent can also be added from time to time in order to maintain the solution in a homogeneous condition. The temperature of copolymerization varies from about 75 to 150° C., with the optimum temperature depending on the solvent selected, the concentration of monomers present therein, the catalyst selected, and the time of the reaction. Much the same conditions prevail when the copolymerization is effected in bulk rather than in the presence of an inert solvent.

The copolymer additives of the invention have apparent molecular weights as determined by standard light scattering methods of at least 2,000 and preferably at least 8,000. For practical purposes, molecular weights of from 100,000 to 1,000,000 are most suitable from the standpoint of viscosity and other physical characteristics of the polymeric additives.

In a preferred application of the copolymeric lubricating oil detergent additives of the present invention in mineral lubricating oil, it has been noted that a certain optimum relationship between the total number of aliphatic carbon atoms to polar groups within the molecule appears to exist. Evidence has been obtained that for a given concentration the copolymer compositions containing a ratio of aliphatic carbon atoms to polar groups within the range of from 50 to 225, preferably 75 to 125, appear to embrace the optimum composition for deposit reduction effectiveness. In determining this apparent balance between the polar and non-polar constituents, the aliphatic carbon atoms to be considered are the following:

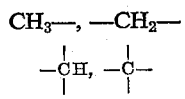

and excluding aromatic ring carbon atoms or the carbon atom of the carbonyl groups. As polar groups, the following representative radicals are included: —OH (either acid, alcohol or phenol), —NH₂,

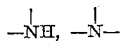

and an acid anhydride group as a single unit.

Although this concept of copolymer compositions appears to correlate generally with their performance in all of the oils of lubricating viscosity, there may be additional composition factors which alter the effect of these improving agents in various types of lubricating oil systems and service. However, on the basis of these assumptions, it becomes evident that variations in the aliphatic carbon to polar ratio and hence performance efficacy may be accomplished by the choice of the acid derivative radical and degree of neutralization in the modification of polar components (B) and (C).

Typical methods for preparing the copolymers which can be employed with success as detergents and anti-wear oxidants in lubricant compositions are given in the following examples:

EXAMPLE I

This example concerns the preparation of a copolymer of dodecyl methacrylate and maleic anhydride. This preparation was effected by copolymerizing equimolar quantities of the two monomers at a temperature of 250° F. for a period of about 6 hours in the presence of benzoyl peroxide as catalyst, a solution of the latter in toluene being slowly added over the course of the reaction period, at the end of which approximately 2% of the peroxide, based on the weight of the monomer reactants, had been added. On stripping out the toluene and the catalyst decomposition products in vacuo, there remains an oil-soluble copolymer which has good detergency and anti-wear characteristics when employed in a crankcase lubricant in an internal combustion engine. This copolymer had an apparent molecular weight of approximately 175,000.

EXAMPLE II 59.5 g. (0.234 mole) of dodecyl methacrylate, 18 g. (0.18 mole) maleic anhydride, 0.16 g. benzoyl peroxide and 0.22 g. tert. butyl peroxide were mixed with 5 cc. of benzene. The mixture was stirred and heated at 208° F. for one hour. A solution of 476 g. dodecyl methacrylate, 0.93 g. benzoyl peroxide, 1.31 g. tert. butyl peroxide and 10 cc. benzene was added slowly over a nine hour period. The mixture was maintained at 208–218° F. for 88 hours. The mixture was then stripped to give 497 g. of the copolymer of maleic anhydride and dodecyl methacrylate. 150 g. of the copolymer was precipitated from a benzene solution with a 50–50 mixture of acetone and methanol to give 126 g. of purified product. Analysis of the purified product indicated a monomer molar ratio of ester to anhydride of 13:1.

123 g. of the purified copolymer obtained above was dissolved in 3.4 liters of benzene. The solution was heated ot reflux. 170 cc. of 0.5 N alcoholic potassium hydroxide solution was added. The mixture was heated for about 5 minutes. A solvent mixture consisting of 1.4 liters each of acetone and ether with 1.68 liters each of ethyl alcohol and water was added, followed by 200 cc. 0.5 N hydrochloric acid. The mixture was rapidly stirred for 30 minutes. Following this two layers separated. The benzene layer or phase was washed with an equal volume of water and then stirpped of solvent. Analysis of the copolymeric product thus obtained indicated a 13:1 molar ratio of dodecyl methacrylate to maleic acid.

EXAMPLE III 317 g. of a 1:1 copolymer of allyl stearate and maleic anhydride was mixed with 191 g. of dodecyl methacrylate, 90 cc. of toluene and 3.63 g. of benzoyl peroxide. The mixture was stirred and heated at 220–240° F. for 3 hours. During the next 15 hours, 10.6 g. of benzoyl peroxide catalyst was added along with sufficient toluene to facilitate stirring. The reaction mixture was stripped to yield 503 g. of product consisting of the copolymer of allyl stearate and dodecyl methacrylate with maleic anhydride in approximately 1/1/1 mole ratio.

EXAMPLE IV 250 g. of ternary copolymer of allyl stearate, maleic anhydride and dodecyl methacrylate prepared according to the procedure of Example III was mixed with 72 g. of dodecanol and 110 cc. of xylene. The mixture was stirred and heated at 350° F. for 6 hours. The solvent and unreacted alcohol were stripped from the reaction mixture to give 303 g. of product. Analysis of the product indicated that 35% of the available acid in the allyl stearate, dodecyl methacrylate and maleic anhydride copolymer was esterified with dodecanol. The final product was the copolymer of allyl stearate, dodecyl methacrylate, monododecyl maleate and maleic anhydride in approximately 3/3/2/1 molar ratio.

In general, excellent detergent and antiwear properties can be imparted to lubricating oils by dissolving therein a quantity of from about 0.1 to 10% by weight of the copolymers of the type described above, although a preferred range is from about 0.5 to 5% by weight. The copolymeric additives of this invention can be used with good effect in the case of any one of a wide variety of oils of lubricating viscosity, or of blends of such oils. Thus, the base oil can be refined Pennsylvania or other paraffin base oil, a refined naphthenic base oil, or a synthetic hydrocarbon or non-hydrocarbon oil of lubricating viscosity. As synthetic oils there can be mentioned alkylated waxes and similar alkylated hydrocarbons of relatively high molecular weight, hydrogenated polymers of hydrocarbons, and the condensation of products of chlorinated alkyl hydrocarbons with aromatic compounds. Other suitable oils are those which obtained by polymerization of lower molecular weight alkylene oxides such as propylene and/or ethylene oxide. Still other synthetic oils are obtained by etherification and/or esterification of the hydroxy groups in alkylene oxide polymers such as, for example, the acetate of the 2-ethyl-hexanol-initiated polymer of propylene oxide. Other important classes of synthetic oils include the various esters as, for example, di(2-ethylhexyl) sebacate, tricresyl phosphate and silicate esters. If desired, the oil can be a mixture of mineral and synthetic oils.

While satisfactory lubricant compositions can be obtained by adding to the base oil employed only one or more of the copolymeric additives of the type described above, it also falls within the purview of this invention to provide lubricant compositions which contain not only such copolymers, but also other additives such as pour point depressants, oiliness and extreme pressure agents, antioxidants, corrosion inhibiting agents, blooming agents, thickening agents and/or compounds for enhancing the temperature-viscosity characteristics of the oil. The present invention also contemplates the addition to the lubricant composition (particularly when the amount of copolymer employed is relatively small) of auxiliary detergents and/or antiwear agents.

The efficacy of copolymeric additives of the type described above as detergents and antiwear agents in lubricating oils is illustrated by data from a number of tests. In the tests from which the data is obtained the base oil, unless otherwise specified, is a solvent-refined, wax-free SAE-30 grade mineral lubricating oil having a viscosity index of 85 which is derived from California waxy crude. Various amounts of the copolymeric additives are incorporated into the oil as noted in terms of percent by weight.

In the test where the piston varnish ratings are obtained, a given lubricating oil composition is tested as the crankcase lubricant in a 6-cylinder Chevrolet engine using a low grade gasoline especially prone to cause engine deposits, the conditions being those defined in the standard FL-2 test procedure as described in the June 21, 1948, report of the Coordinating Research Council. This procedure requires the maintenance of a jacket temperature of 95° F. and a crankcase oil temperature of 155° F. at 2500 r.p.m. and 45 brake horsepower of 40 hours, and therefore closely simulates the relatively "cold" engine conditions which are normally experienced in city driving. At the end of each test, the engine is dismantled and the amount of engine deposits on the piston determined and expressed as the piston varnish rating. This value is obtained by visually rating (on a scale of 0 to 10, with 10 representing the absence of any deposit) the amount of deposit on each piston skirt and averaging the individual ratings so obtained for the various pistons. Under the conditions of this test, a piston varnish rating of 4.5 is indicative of satisfactory performance, though preferably this rating should be 5 or above. The wear experienced by the piston rings during the test is also measured in certain cases and expressed in mgs. of metal lost per hour. 5 mgs. per hour is regarded as satisfactory, though preferably the loss should be 3 mgs. or less per hour. In the case of the base oil alone without the addition of any additives it is found that the piston varnish rating is approximately 3.0 and the piston ring weight loss is 5.5 mgs./hr. On the other hand, as indicated by the data presented in Table I below, when the base oil is compounded with the indicated amounts of a copolymer, greatly superior results are obtained.

Table I

| Lubricant Composition | Ratio of (1) Monomer to (2) Monomer to (3) Monomer | Piston Varnish Rating | Piston Ring Wear Rate, Mg./Hr. |
| --- | --- | --- | --- |
| Base Oil alone | | 3.0 | 5.0 |
| 2.5% (1) Dodecyl Methacrylate and (2) Maleic Anhydride in base oil | 1/1 | 4.8 | 4.0 |
| 1.5% (1) Dodecyl Methacrylate and (2) Maleic Acid in base oil | 13/1 | 5.3 | |
| 1.5% (1) Allyl Stearate, (2) Dodecyl Methacrylate, (3) Maleic Anhydride, and (4) Maleic Acid in base oil | 14/35/2/12 | 5.1 | |
| 2.5% (1) Allyl Stearate, (2) Dodecyl Methacrylate, (3) di-(Dodecyl) maleate and (4) Mono-dodecyl maleate in base oil | 5/5/1/4 | 5.2 | |

From the test results of the foregoing table it will be seen that each of the illustrative compositions containing the copolymeric lubricating oil additives according to the invention possess greatly improved lubricating properties compared to the base oil alone.

In the foregoing description of the invention, the term "hydrocarbyl" is used with reference to the class of organic groups commonly known as "hydrocarbon groups." As employed herein, this term is considered to be a more convenient and concise generic expression for describing said hydrocarbon groups.

This application is a division of Stewart, Stuart and Lowe patent application Serial No. 563,204, filed February 3, 1956, which in turn is a continuation-in-part of Stewart, Stuart and Lowe, patent application Serial No. 328,153, filed December 26, 1952, and now abandoned.

We claim:

1. A lubricant composition comprising a major portion of an oil of lubricating viscosity, together with from about 0.1 to 10% by weight of a copolymer of (A) a higher alkyl methacrylate having from 8 to 30 carbon atoms in the alkyl group and (B) maleic acid, said components being present in the copolymer in the ratio of from about 3 to 15 monomer units of said ester component (A) for each monomer unit of said maleic acid, and said copolymer having a molecular weight of at least 2,000.

2. A lubricant composition comprising a major portion of an oil of lubricating viscosity, together with from about 0.1 to 10% by weight of a copolymer of (A) dodecyl methacrylate and (B) maleic acid, said components being present in the copolymer in the ratio of from about 3 to 15 monomer units of said dodecyl methacrylate for each monomer unit of said maleic acid, and said copolymer having a molecular weight of at least 2,000.

3. A lubricant composition comprising a major portion of mineral lubricating oil, together with from about 0.1 to 10% by weight of a copolymer of (A) dodecyl methacrylate and (B) maleic acid, said components being present in the copolymer in the ratio of from about 3 to 15 monomer units of said dodecyl methacrylate for each monomer unit of said maleic acid, and said copolymer having a molecular weight of at least 2,000.

4. A lubricant composition comprising a major portion of mineral lubricating oil, together with from about 0.1 to 10% by weight of a copolymer of (A) a higher alkyl methacrylate having from 8 to 30 carbon atoms in the alkyl group and (B) maleic acid, said components being present in the copolymer in the ratio of from about 3 to 15 monomer units of said ester component (A) for each monomer unit of said maleic acid and said copolymer having a molecular weight of at least 2,000.

5. A lubricant composition comprising a major portion of mineral lubricating oil and a minor portion sufficient to enhance the detergent characteristics of the composition of a copolymer of (A) a higher alkyl methacrylate having from 8 to 30 carbon atoms in the alkyl group and (B) maleic acid, said components being present in the copolymer in the ratio of from about 3 to 15 monomer units of said ester component (A) for each monomer unit of said maleic acid and said copolymer having a molecular weight of at least 2,000.

References Cited in the file of this patent

UNITED STATES PATENTS

| | | |
|---|---|---|
| 2,615,844 | Giammaria | Oct. 28, 1952 |
| 2,615,845 | Lippincott et al. | Oct. 28, 1952 |
| 2,666,044 | Catlin | Jan. 12, 1954 |
| 2,728,751 | Catlin | Dec. 27, 1955 |